June 21, 1932.    L. H. MORRILL    1,864,314
VALVE TAPPET OILING MECHANISM
Filed May 31, 1930
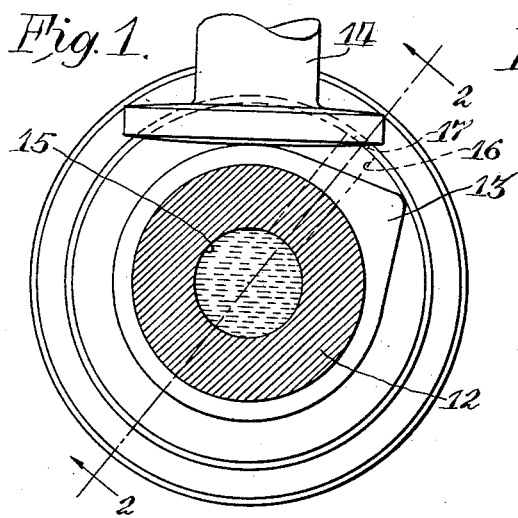
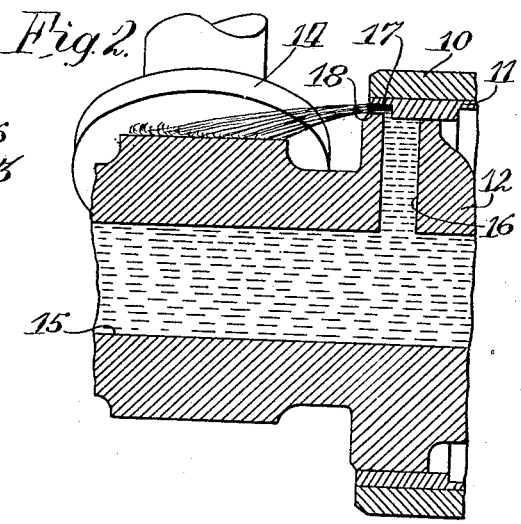
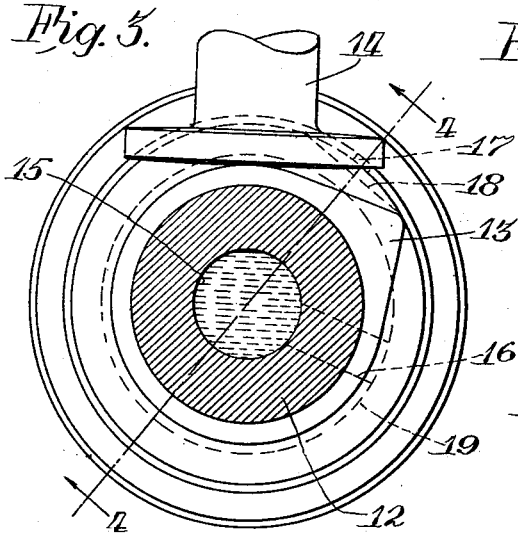
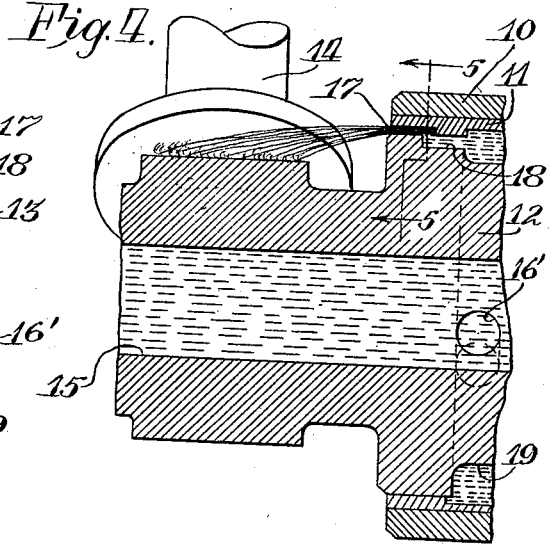
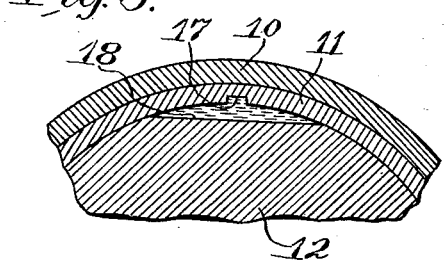
Inventor
Lewis H. Morrill
By H. P. Doolittle
Atty Patented June 21, 1932

1,864,314

UNITED STATES PATENT OFFICE

LEWIS H. MORRILL, OF FORT WAYNE, INDIANA, ASSIGNOR TO INTERNATIONAL HARVESTER COMPANY, A CORPORATION OF NEW JERSEY

VALVE TAPPET OILING MECHANISM

Application filed May 31, 1930. Serial No. 458,003.

The invention relates to improvements in means for lubricating valve tappets operable by cams on cam shafts, such as occur, for example, in internal combustion engines, or the like.

The primary object of the invention is to supply to the cam noses a quantity of oil, automatically, and once for each revolution of the cam shaft.

Another object is generally to improve oiling for the purpose stated and by means of simple structure which will be positive and certain in operation.

Briefly, these desirable objects may be achieved by the illustrative examples of structure appearing in the accompanying sheet of drawing, in which:

Figure 1 is an end view;

Figure 2 is a cross section as seen along the line 2—2 of Figure 1;

Figure 3 is another end view of a slightly modified structure;

Figure 4 is a cross section as seen along the line 4—4 of Figure 3; and,

Figure 5 is a fragmentary view in section as seen along the line 5—5 appearing in Figure 4.

Cam shaft bearings are shown at 10 including the usual bearing bushings 11, in which is turnably mounted the cam shaft 12 formed with cams 13 that engage and operate the tappets 14 for engine valves not shown. As these cams frictionally wipe the tappets once for each revolution of the shaft to raise the valves, it is a problem to provide lubricant to the cooperating cam and tappet surfaces to prevent wear. The structure of this invention provides an intermittent supply of lubricant to the tappet end and cam at the instant it is most needed, mainly just before the cam pushes up on the tappet. Said structure will now be described in detail.

The cam shaft is bored out axially, as at 15, to receive lubricant under pressure from the usual engine pressure oil line. In the form illustrated in Figures 1 and 2, a radial bore 16 leads oil from the cam shaft bore 15 to a cut-out providing a small chamber 17 in the bushing 11. The shaft 12, of course, is concentric and snugly fits the bushing to prevent escape of oil from the chamber 17, except for the provision of a short, flattened surface 18 formed on the shaft, which surface, once during each revolution of the shaft, registers with the chamber 17, thus functioning as a spout to splash the lubricant laterally from between the shaft and bushing onto the nose of the cam 13 just before it begins to push up on the tappet, as will be readily understood.

The structure of Figures 3 and 4 is the same in all essential respects as that above described. The only departure resides in the provision of an annular groove 19 in the cam shaft, said groove receiving the oil through the radial bore 16', said groove having communication with the chamber 17, as shown.

In operation, the oil passes under pump pressure through the cam shaft bore 15, thence out radially through the bore 16 or 16' to the chamber 17 when said bores 16 or 16' are in registry with said chamber, as shown in Figure 2. Accordingly, with the flat surface 18 presented to the chamber 17, the oil is jetted out onto the cam to lubricate the same. The form of Figure 2 is designed for center bearings and gives a direct connection between the cam shaft bore 15 and the chamber 17, whereas the form shown in Figure 2 is especially designed for association with end bearings.

From this detailed description, it must now be appreciated that a structure is provided by this invention, which achieves all of the desirable objects heretofore recited.

It is the intention to cover all such changes which do not materially depart from the spirit and scope of the invention as indicated by the definitions thereof comprising the following claims.

What is claimed is:

1. In an engine or the like having a cam shaft formed with a cam for moving a tappet, a bearing bushing journaling the shaft adjacent the cam, the shaft having a bore containing lubricant which is delivered through a radial bore in the shaft to a chamber formed in the bushing, and a cut away surface formed on the periphery of the shaft designed to register with the chamber whereby lubricant is spouted laterally from between the shaft and bushing onto the cam.

2. In an engine or the like having a cam shaft formed with a cam for moving a tappet, a bearing bushing journaling the shaft adjacent the cam, the shaft having a bore containing lubricant which is delivered through a radial bore in the shaft to a chamber formed in the bushing, and a flat surface formed tangent to and on the shaft periphery, said surface registering once for each turn of the shaft with the chamber to cause an intermittent jetting of oil laterally from between the shaft and bushing onto the cam.

3. In an engine or the like having a cam shaft formed with a cam for moving a tappet, a bearing bushing adjacent the cam journaling the shaft, the shaft having a bore containing lubricant which is delivered through a radial bore in the shaft to a chamber formed in the bushing, and a cut away surface formed on the periphery of the shaft designed to register with the chamber whereby lubricant is spouted laterally from between the shaft and bushing onto the cam, the structure being so arranged that the oiling takes place at the instant the cam nose begins to wipe and push on the tappet.

4. In an engine or the like having rotatable cam shaft formed with a cam for moving a tappet, a stationary bushing journaling the shaft, a chamber being formed in the bushing, said chamber receiving a supply of oil from an oil bore in the shaft, and a pocket formed on the shaft to register with the chamber whereby oil is jetted laterally from between the bushing and shaft onto the cam.

5. In combination, a rotatable shaft and a stationary bearing, said bearing formed with a chamber which is supplied with oil and the shaft formed with a pocket that is adapted to register with said chamber to cause the oil to be jetted laterally from between the bushing and shaft.

6. In an engine or the like having a rotatable cam shaft formed with a cam for moving a tappet, a stationary bushing adjacent the cam journaling the shaft, said bushing formed with a chamber, means to supply oil to the chamber, and a pocket formed on the shaft to register with the chamber whereby oil is jetted laterally from between the shaft and bushing onto the cam.

In testimony whereof I affix my signature.

LEWIS H. MORRILL.